United States Patent
Chen et al.

(10) Patent No.: US 11,897,049 B2
(45) Date of Patent: Feb. 13, 2024

(54) RETRACTABLE FRICTION STIR WELDING SPINDLE

(71) Applicant: BEIJING UNIVERSITY OF TECHNOLOGY, Beijing (CN)

(72) Inventors: Shujun Chen, Beijing (CN); Bo Cheng, Beijing (CN); Xinhong Xie, Beijing (CN); Zirui Cao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/132,430

(22) Filed: Apr. 10, 2023

(65) Prior Publication Data

US 2023/0241707 A1    Aug. 3, 2023

Related U.S. Application Data

(63) Continuation of application No. PCT/CN2021/124657, filed on Oct. 19, 2021.

(30) Foreign Application Priority Data

Oct. 22, 2020 (CN) .......................... 202011138701.3

(51) Int. Cl.
   *B23K 20/00* (2006.01)
   *B23K 20/12* (2006.01)
(52) U.S. Cl.
   CPC ................. *B23K 20/1245* (2013.01)
(58) Field of Classification Search
   CPC ............. B23K 20/125; B23K 20/1255; B23K 20/123; B23K 20/1245; B23K 20/26
   See application file for complete search history.

(56) References Cited

U.S. PATENT DOCUMENTS

| 5,893,507 A * | 4/1999 | Ding ................... B23K 20/125 228/2.1 |
| 10,661,379 B1 * | 5/2020 | Larsson ................. B23K 37/08 |

(Continued)

FOREIGN PATENT DOCUMENTS

| CN | 202555966 U | 11/2012 |
| CN | 103084730 A | 5/2013 |

(Continued)

OTHER PUBLICATIONS

International Search Report of PCT/CN2021/124657.
(Continued)

*Primary Examiner* — Erin B Saad
(74) *Attorney, Agent, or Firm* — J.C. PATENTS

(57) ABSTRACT

The invention provides a retractable friction stir welding spindle, aims at the deficiencies and defects of the existing friction stir welding spindle technology, that is, when the welding is finished, the stirring needle leaves a keyhole at the end of the weld seam, which affects the forming performance of the workpiece, the overall structure design of the spindle is complicated with many transmission chains and low reliability which is difficult to realize modularization. The retractable friction stir welding spindle includes an electric spindle system and a retracting mechanism. The electric spindle system includes stirring shaft shoulder, hilt, front end cover, hollow spindle, motorized spindle shell, motor rotor, motor stator, tail end cover, etc. The retracting mechanism includes stirring needle, connecting ball head and electric cylinder. The invention has the advantages of simple structure and can be mainly divided into two modules to improve reliability and integrity. The invention can also avoid the generation of friction stir welding keyhole.

3 Claims, 1 Drawing Sheet

(56) References Cited

U.S. PATENT DOCUMENTS

| | | | |
|---|---|---|---|
| 2005/0045695 A1* | 3/2005 | Subramanian | B23K 20/125 228/112.1 |
| 2006/0032887 A1* | 2/2006 | Haynie | B23K 20/125 228/2.1 |
| 2007/0152015 A1* | 7/2007 | Burton | B23K 20/1255 228/2.1 |
| 2007/0228104 A1* | 10/2007 | Mankus | B23K 20/125 228/101 |
| 2007/0267462 A1* | 11/2007 | Burton | B23K 20/125 228/114.5 |
| 2008/0006677 A1* | 1/2008 | Kumagai | B23K 20/125 228/101 |
| 2010/0147925 A1* | 6/2010 | Hanlon | B23K 20/233 228/2.1 |
| 2019/0262934 A1* | 8/2019 | Ohashi | B23K 20/12 |
| 2019/0299325 A1* | 10/2019 | Landmark | B23K 20/125 |
| 2019/0344380 A1* | 11/2019 | Miles | B23K 20/1255 |
| 2020/0096907 A1* | 3/2020 | Higashimura | G03G 15/0879 |
| 2020/0164457 A1* | 5/2020 | Rosengren | H02K 7/00 |
| 2021/0178510 A1* | 6/2021 | Lee | B23K 20/125 |
| 2021/0364070 A1* | 11/2021 | Keranen | F16H 57/0497 |
| 2022/0331897 A1* | 10/2022 | Pierron | B23K 20/125 |

FOREIGN PATENT DOCUMENTS

| | | |
|---|---|---|
| CN | 103406659 A | 11/2013 |
| CN | 104070288 A | 10/2014 |
| CN | 104475965 A | 4/2015 |
| CN | 204657733 U | 9/2015 |
| CN | 105728935 A | 7/2016 |
| CN | 205571704 U | 9/2016 |
| CN | 106001899 A | 10/2016 |
| CN | 106141415 A | 11/2016 |
| CN | 106891089 A | 6/2017 |
| CN | 110977139 A | 4/2020 |
| CN | 111545891 A | 8/2020 |
| CN | 211490071 U | 9/2020 |
| CN | 112453681 A | 3/2021 |
| JP | 2002192358 A | 7/2002 |
| JP | 2012139731 A | 7/2012 |

OTHER PUBLICATIONS

First Search Report of the priority application CN20201138701.3.
Second Search Report of the priority application CN20201138701.3.

* cited by examiner

RETRACTABLE FRICTION STIR WELDING SPINDLE

CROSS-REFERENCE TO RELATED APPLICATION

This application is a continuation of international application PCT/CN2021/124657 filed on Oct. 19, 2021, which claims priority to Chinese application No. 202011138701.3, filed on Oct. 22, 2020, the contents of the above identified applications are hereby incorporated by reference in its entirety and made a part of this specification.

TECHNICAL FIELD

The invention relates to the field of friction stir welding equipment, in particular to a friction stir welding spindle with a retraction function.

BACKGROUND

Friction stir welding is a solid phase joining technology, which was invented by the British Welding Institute (TWI) in 1991. The high-speed rotating stirring head penetrates into the workpiece and then moves along the welding direction, generating frictional heat at the contact part between the stirring head and the workpiece, so that the surrounding metal forms a plastic softening layer, and the material connection is realized under the stirring and extrusion action of the stirring shaft shoulder and the stirring needle. At present, most of the fixed stirring heads are used. At the end of welding, the stirring needle leaves a keyhole at the end of the weld, which affects the forming performance of the workpiece. It is considered to use the technology of stirring needle retraction to eliminate the keyhole. In order to realize the withdrawal function of the main shaft, the overall structure design of some main shafts is complicated is complicated with many transmission chains and low reliability which is difficult to realize modularization.

SUMMARY

The invention provides a retractable friction stir welding spindle, aims at the deficiencies and defects of the existing friction stir welding spindle technology, that is, when the welding is finished, the stirring needle leaves a keyhole at the end of the weld seam, which affects the forming performance of the workpiece, the overall structure design of the spindle is complicated with many transmission chains and low reliability which is difficult to realize modularization.

A retractable friction stir welding spindle includes an electric spindle system and a retracting mechanism.

The electric spindle system includes stirring shoulder (1), hilt (2), front cover (3), hollow spindle (4), front bearing chamber (5), retaining ring (6), angular contact ball bearing ABCD (7), thread retaining ring A (8), electric spindle shell (9), motor rotor (10), motor stator (11), rear bearing chamber (12), angular contact ball bearing E (13), rear bearing chamber end cover (14), encoder (15), connecting sleeve (16), thread retaining ring B (17), tail end cover (18).

The retracting mechanism comprises a stirring needle (19) and a retracting structure (20).

The angular contact ball bearing ABCD (7) is installed inside the front bearing chamber (5), the rear end of the angular contact ball bearing ABCD (7) is locked by the thread retaining ring A (8), and the motor stator (11) is installed on one end of the electric spindle shell (9), its right side is close to the inner wall of the electric spindle shell (9), and the motor rotor (10) is installed on the fourth stepped shaft of the hollow spindle (4) with an interference fit, and its position is fitted tightly with the motor stator (11), the angular contact ball bearing ABCD (7) is installed in conjunction with the hollow spindle (4), the front bearing chamber (5) and the end face of the other end of electric spindle shell (9) are fixed by bolts, the front end cover (3) is fixed on the left end face of the front bearing chamber (5) by bolts. The rear bearing chamber (12) is fixed to the right end face of the electric spindle shell (9) by bolts, and the hole of the rear bearing chamber (12) is filled with an angular contact ball bearing E (13), and the angular contact ball bearing E (13) is also assembled on the first stepped shaft on the right side of the hollow spindle (4). The rear bearing chamber end cover (14) is fixed on the right end face of the rear bearing chamber (12) by bolts, and the parts of the encoder (15) are fixed on the right end face of the rear bearing chamber end cover (14). The rest parts of the encoder (15) are installed on the first stepped shaft on the right side of the hollow spindle (4), and it is locked by the thread retaining ring B (17). The left end face of the connecting sleeve (16) is fixed to the right outer edge of the electric spindle shell (9) by bolts, the tail end cover (18) is fixed to the right end face of the connecting sleeve (16) by bolts, and the hilt (2) is assembled on the leftmost end face of the hollow spindle (4) through bolts, the stirring shaft shoulder (1) is fitted and fixed with the inner hole of the hilt (2) to form an electric main shaft without a retraction function. The rotation of the motor rotor (10) after power-on drives the hollow spindle (4) to rotate at a high speed, and the hollow spindle (4) drives the hilt (2) and the stirring shaft shoulder (1) rotate together. The tail of the retracting structure (20) is connected with the tail end cover (18) by bolts, the stirring needle (19) and the retracting structure (20) are connected by threads and then protrude from the stirring shaft shoulder (1). When the electric spindle is energized, the internal motor rotor (10) rotates, driving the hollow spindle (4) to rotate at high speed to complete the main movement function of the spindle. In the retracting mechanism, the upward and downward movement of the retracting structure (20) can make the stirring needle (19) complete the function of gradual retraction, thereby realizing the function of eliminating the keyhole in the friction stir welding.

Compared with the existing technology, the present invention is composed of an external motor and an internal electric cylinder together to form a retractable friction stir welding spindle. The external motor mainly realizes the rotary motion of the electric spindle and the needles are connected with retracting structure to realize the function of retracting. The structure of the invention is simple, and can be mainly divided into two modules, which improves the reliability and integrity, and the invention can avoid the generation of friction stir welding keyhole.

Figure 1:
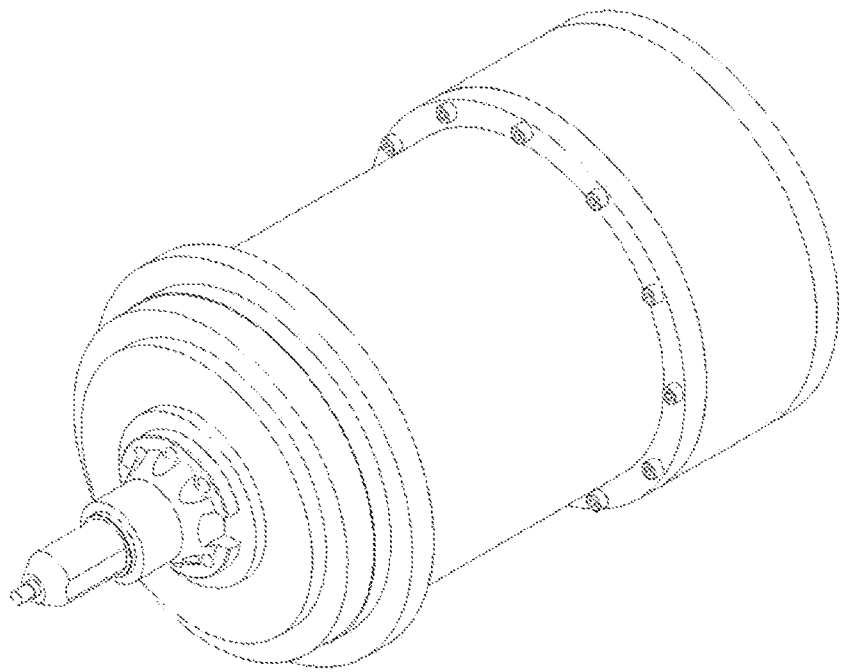
FIG. 1 is the overall appearance diagram of the present invention.
Figure 2:
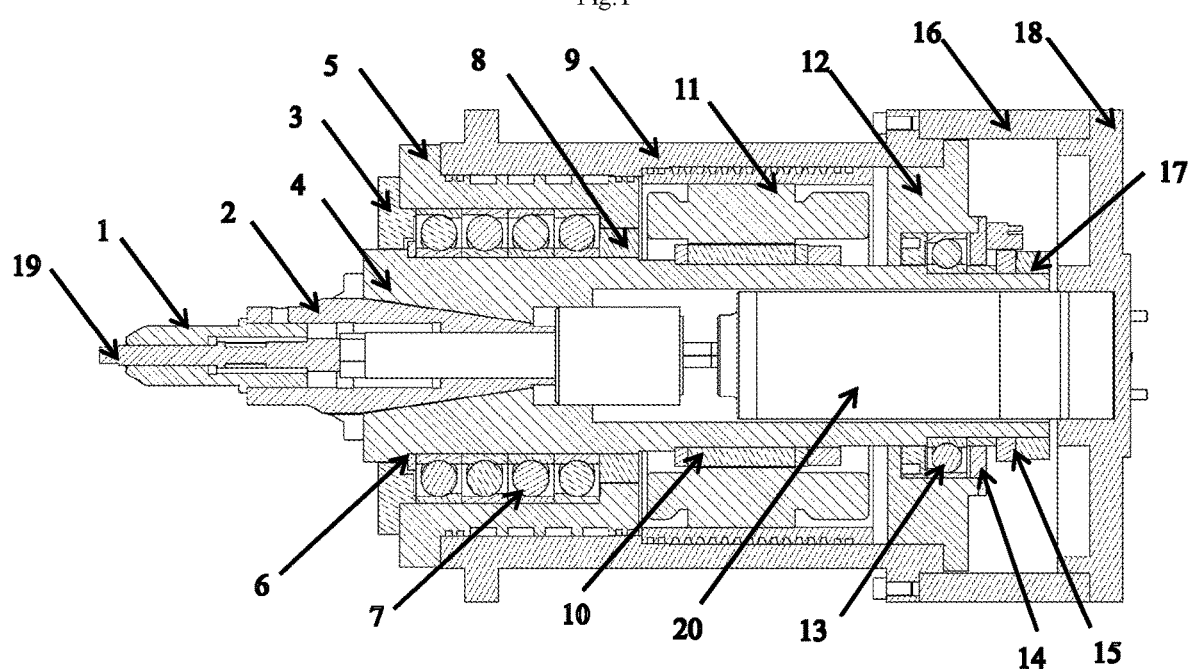
FIG. 2 is an internal structure diagram of the present invention.

Wherein: 1 is the stirring shaft shoulder, 2 is the hilt, 3 is the front end cover, 4 is the hollow spindle, 5 is the front bearing chamber, 6 is the retaining ring, 7 is the angular contact ball bearing ABCD, 8 is the thread retaining ring A, 9 is the electric spindle shell, 10 is the motor rotor, 11 is the motor stator, 12 is the rear bearing chamber, 13 is the angular contact ball bearing E, 14 is the end cover of the rear bearing chamber, 15 is the encoder, 16 is the connecting sleeve, 17 is thread retaining ring B, 18 is the tail end cover, 19 is the stirring needle, 20 is the retracting structure.

PREFERRED EMBODIMENT

The present invention will be described in detail below in conjunction with the accompanying drawings and specific embodiments.

A retractable friction stir welding spindle includes an electric spindle system and a retracting mechanism.

The electric spindle system includes stirring shoulder (1), hilt (2), front cover (3), hollow spindle (4), front bearing chamber (5), retaining ring (6), angular contact ball bearing ABCD (7), thread retaining ring A (8), electric spindle shell (9), motor rotor (10), motor stator (11), rear bearing chamber (12), angular contact ball bearing E (13), rear bearing chamber end cover (14), encoder (15), connecting sleeve (16), thread retaining ring B (17), tail end cover (18). The retracting mechanism comprises a stirring needle (19) and a retracting structure (20).

The retaining ring (6) is installed on the second stepped shaft on the right side of the hollow spindle (4), and fits with the first stepped shaft. The angular contact ball bearing ABCD (7) fits with the retaining ring (6), and then it is installed inside the front bearing chamber (5), the rear end of the angular contact ball bearing ABCD (7) is locked by the thread retaining ring A (8), and the motor stator (11) is installed on right end of the electric spindle shell (9), its right side is close to the inner wall of the electric spindle shell (9), and the motor rotor (10) is installed on the fourth stepped shaft of the hollow spindle (4) with an interference fit, and its position is fitted tightly with the motor stator (11), the angular contact ball bearing ABCD (7) is installed in conjunction with the hollow spindle (4), the front bearing chamber (5) and the end face of the left end of electric spindle shell (9) are fixed by bolts, the front end cover (3) is fixed on the left end face of the front bearing chamber (5) by bolts. The rear bearing chamber (12) is fixed to the right end face of the electric spindle shell (9) by bolts, and the hole of the rear bearing chamber (12) is filled with an angular contact ball bearing E (13), and the angular contact ball bearing E (13) is also assembled on the first stepped shaft on the right side of the hollow spindle (4). The rear bearing chamber end cover (14) is fixed on the right end face of the rear bearing chamber (12) by bolts, and the parts of the encoder (15) are fixed on the right end face of the rear bearing chamber end cover (14). The rest parts of the encoder (15) are installed on the first stepped shaft on the right side of the hollow spindle (4), and it is locked by the thread retaining ring B (17). The left end face of the connecting sleeve (16) is fixed to the right outer edge of the electric spindle shell (9) by bolts, the tail end cover (18) is fixed to the right end face of the connecting sleeve (16) by bolts, and the hilt (2) is assembled on the leftmost end face of the hollow spindle (4) through bolts, the stirring shaft shoulder (1) is fitted and fixed with the inner hole of the hilt (2) to form an electric main shaft without a retraction function. This constitutes an electric spindle that does not include a retraction function. The tail of the retracting structure (20) is connected with the tail end cover (18) by bolts, the stirring needle (19) and the retracting structure (20) are connected by threads and then protrude from the stirring shaft shoulder (1). When the electric spindle is energized, the internal motor rotor (10) rotates, driving the hollow spindle (4) to rotate at high speed to complete the main movement function of the spindle. The rotation of the motor rotor (10) after power-on drives the hollow spindle (4) to rotate at a high speed, and the hollow spindle (4) drives the hilt (2) and the stirring shaft shoulder (1) rotate together. In the retracting mechanism, the upward and downward movement of the retracting structure (20) can make the stirring needle (19) complete the function of gradual retraction, thereby realizing the function of eliminating the keyhole in the friction stir welding.

The main working process of the electric spindle is that after the electric spindle is energized, the motor rotor (10) of the electric spindle rotates, so that the hollow spindle (4) rotates at a high speed, and at the same time, the hilt (2) fixed by on the hollow spindle rotates together, and the hilt (2) drives the stirring shaft shoulder (1) installed in its inner hole to rotate. At the same time, when the electric spindle rotates, the internal retracting mechanism works, and the retracting structure (20) is energized to make the stirring needle (19) protrude, and at the same time, the stirring needle (19) will follow the stirring shaft shoulder (1) to rotate at high speed. Water inlet and outlet holes are processed on the electric spindle shell (9), and trapezoidal grooves are processed on the outer surface of the front bearing chamber (5) and the motor stator (11), discharged from the outlet hole to form a set of cooling circuit for the electric spindle. Finally, according to the required position, the retracting structure (20) drives the stirring needle (19) to move, so that the stirring needle (19) can complete the function of gradually retracting, thereby realizing the elimination of the keyhole in the friction stir welding.

We claim:

1. A retractable friction stir welding spindle comprising:
an electric spindle system and a retracting mechanism;
wherein, in the electric spindle system, a first angular contact ball bearing (7) is installed inside a front bearing chamber (5), a rear end of the first angular contact ball bearing (7) is locked by a first threaded retaining ring (8), a left side face of a connecting sleeve (16) is fixed with an outer edge of an electric spindle shell (9) by bolts, and an end cover (18) is fixed with an end face of the connecting sleeve (16) by bolts; a hilt (2) is assembled on an end face of a hollow spindle (4) by bolts, and a stirring shaft shoulder (1) is installed and fixed with an inner hole of the hilt (2), forming an electric spindle without retracting function; a motor rotor (10) rotates after energization and drives the hollow spindle (4) to rotate, so that the hilt (2) and the stirring shaft shoulder (1) rotate together;
in a retracting machine, a stirring needle (19) and a retracting structure (20) are connected by threads and then stretch out from the stirring shaft shoulder (1), a rear part of the retracting structure (20) of the retracting machine is connected to a tail end cover (18) by bolt;
when the electric spindle is energized, the motor rotor (10) therein rotates, driving the hollow spindle (4) to rotate at a high speed to complete spindle moving function; up and down translation motion of the retracting mechanism is completed by the retracting structure (20), so that the stirring needle (19) completes the function of gradual retraction, and then realizes function of eliminating keyhole in the friction stir welding;
in the electric spindle system, a motor stator (11) is installed at one end of the electric spindle shell (9), and a side surface of the motor stator (11) is fixed to an inner wall of the electric spindle shell (9); the motor rotor (10) is installed on a fourth stepped shaft of the hollow spindle (4) with an interference fit, and its position is matched with the motor stator (11), the first angular contact ball bearing (7) is fitted with the hollow spindle (4).

2. The retractable friction stir welding spindle according to claim 1, wherein, in the electric spindle system, the front bearing chamber (5) and the end face of the other end of the electric spindle shell (9) are fixed by bolts, the front end cover (3) is fixed on the left end face of the front bearing chamber (5) by bolts; the rear bearing chamber (12) is fixed on the right end face of the electric spindle shell (9) by bolts, a second angular contact ball bearing (13) is installed into a hole of rear bearing chamber (12), and the second angular contact ball bearing (13) is also assembled on a first step shaft on the right side of the hollow spindle (4).

3. The retractable friction stir welding spindle according to claim 1, wherein, in the electric spindle system, a rear bearing chamber end cover (14) is fixed on the right end face of the rear bearing chamber (12) by bolts, an encoder (15) is fixed on the right end face of the rear bearing chamber end cover (14), the remaining parts of the encoder (15) are installed on the first stepped shaft on the right side of the hollow spindle (4), and is locked by a second thread retaining ring (17).

\* \* \* \* \*